3,218,324
1-METHYL ERGOTAMINES AND ERGOCORNINES
Albert Hofmann and Franz Troxler, both of Bottmingen, Basel-Land, Switzerland, assignors to Sandoz Ltd. (a/k/a Sandoz A.G.), Basel, Switzerland
No Drawing. Original application Aug. 24, 1960, Ser. No. 51,513, now Patent No. 3,113,133, dated Dec. 3, 1963. Divided and this application Nov. 13, 1963, Ser. No. 332,324
Claims priority, application Switzerland, May 18, 1956, 33,377/56; Mar. 20, 1957, 44,070/57; Apr. 16, 1957, 45,100/57; Mar. 7, 1958, 56,767/58; Mar. 11, 1960, 2,765/60
3 Claims. (Cl. 260—285.5)

The present invention, which is a continuation-in-part application of applications Ser. Nos. 658,505, filed May 13, 1957, 796,730 filed March 3, 1959, and 843,939 filed Oct. 2, 1959 all abandoned and division of 51,513, filed August 24, 1960, now U.S. Patent No. 3,113,133 relates to new compounds of the lysergic acid series which are alkylated at the indol-nitrogen atom. As will hereinafter appear, these new compounds are useful particularly for therapeutic purposes.

The new compounds of the present invention correspond to the formula

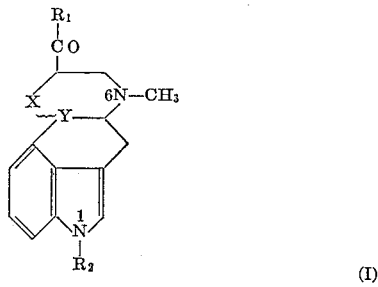

wherein $R_1$ is an alkoxy, hydroxyalkylamino, amino, monoalkylamino, dialkylamino or 1-pyrrolidino group or the tripeptide radical of the natural water-insoluble ergot alkaloids, $R_2$ is lower alkyl, lower alkenyl or aralkyl, and X Y stands for

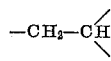

(dihydrolysergic acid derivatives) or for $-CH=C<$ (lysergic or isolysergic acid derivatives). They may be prepared by treating the corresponding compounds of the formula

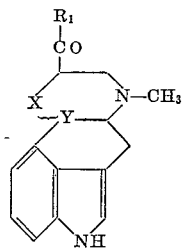

wherein $R_1$ and X Y have the afore-recited significances, in liquid ammonia, with alkali metal amide, and then reacting the resulting alkali salt in the same solvent with an organic halogen compound of the formula $$R_2X$$

wherein $R_2$ has the precedingly recited significance, and X is a halogen atom.

The possibilities of chemically altering the molecule of lysergic acid and its derivatives—the most important of which are the natural ergot alkaloids and their dihydro compounds—by substitution, are very limited. The chemical reactions involve great difficulties, which are ascribable to the tendency of the lysergic acid molecule to break down, to the sensitiveness of the said molecule to oxidizing agents and acid reagents and even to atmospheric oxygen and to light, and to the ease with which the said molecule isomerizes. In particular, it has not heretofore been possible to introduce additional alkyl groups into the lysergic acid molecule since, when conventional alkylating methods are employed with alkyl halides, quaternization of the nitrogen atom in the 6-position takes place very easily.

In accordance with the present invention, the lysergic acid derivatives of Formula II can be alkylated at the indol-nitrogen, by first reacting the said derivatives with an alkali metal amide in liquid ammonia, and then treating the resultant alkali salt in the same solvent with alkyl halide. The alkali metal amide is itself advantageously prepared in the reaction solution by dissolving an alkali metal, preferably sodium or potassium, in liquid ammonia, and then oxidizing the solution in per se known manner, e.g. by the addition of ferric nitrate. A lysergic acid derivative of Formula II and then, shortly after dissolution is completed, an alkyl halide, preferably methyl iodide or ethyl iodide, are added to the mixture. With derivatives of lysergic acid itself, the alkali metal amide as well as the alkyl halide are used only in slight—at most two-fold—excess in order to avoid side reactions, whereas with derivatives of dihydrolysergic acid a larger excess, e.g. up to the ten-fold quantity, may be employed. To work up the reaction mixture, ammonia is evaporated off and the residue is dissolved, with shaking, in a binary solvent system, e.g. ether-aqueous tartaric acid solution. The lysergic acid derivative alkylated at the indol-nitrogen is isolated according to methods which are per se known in colloid chemistry, and is finally purified, for example by chromatography on aluminum oxide and/or recrystallization.

The so-obtained new derivatives of lysergic acid and dihydrolysergic acid are compounds of Formula I which are solid at room temperature (about 20 to 30° C.) and are for the most part crystalline. They give positive van Urk's and Keller's color reactions in shades which are distinctly different from the corresponding reactions of the starting materials. The new compounds I are strongly active serotonin antagonists. Some of the compounds, as for example 1-methyl-lysergic acid-diethylamide, give rise to symptoms of a central sympathomimetic irritation: they raise the body temperature and the blood sugar level, accelerate the heartbeat etc. All the compounds of the invention can be used therapeutically as serotonin antagonists or as central stimulating pharmaceuticals. Thus, they are useful as vasodilators. They may be administered, for example, per os, intravenously or subcutaneously and are active in doses of 0.1 mg. Because of their central sympathomimetic action, the compounds of the invention can also be used for the treatment of psychic disorders; the modes of administration and the doses are the same as indicated above.

The new lysergic acid derivative, 1-methyl-lysergic acid-1'-hydroxy-butylamide-2' of the formula

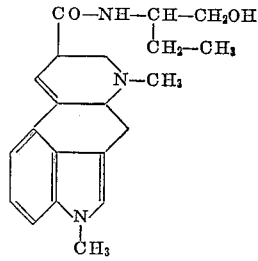

which is methylated at the indol-nitrogen, is a particularly important representative of the compounds I; it is crystalline at room temperature (about 20 to 30° C.). It gives positive van Urk's and Keller's color reactions in shades which are distinctly different from the corresponding reactions of the corresponding starting compound II. The 1-methyl-lysergic acid-1'-hydroxy-butylamide-2' (IA) of the present invention is distinguished by a strong serotonin-inhibiting action, especially it is a very potent inhibitor of an edematous and inflammatory reaction induced by serotonin in the rat paw. The new compound of the present invention inhibits the paw edema provoked in the rat by serotonin in a very low dose of 10 µ/kg. s.c. Thus, the new compound is therapeutically useful in the treatment of inflammatory, arthritic and allergic diseases. Furthermore, the compound is useful in conditions of an abnormally high serotonin production by the cells in man which exhibit enterochrome affinity (so-called carcinoid syndrom). As serotonin is a physiological substance which occurs in most organs and particularly also in the brain, the new compound IA can be also therapeutically useful in the treatment of psychic diseases. Administration may be effected orally, for example using tablets containing the compound IA.

It should be noted that 1-methyl-lysergic acid-diethylamide is hallucinogenic whereas 1-methyl-ergotamine,
1-methyl-ergotaminine,
1-methyl-dihydro-ergotamine,
1-methyl-dihydro-ergokryptine,
1-methyl-dihydro-ergocristine,
1-methyl-dihydro-ergocornine,
1-benzyl-dihydro-ergocristine,
1-benzyl-dihydro-ergocornine,
1-benzyl-dihydro-ergokryptine,
1-allyl-dihydro-ergocristine,
1-allyl-dihydro-ergocornine,
1-allyl-dihydro-ergokryptine,
1-methyl-ergobasine,
1-methyl-lysergic acid-1'-hydroxy-butylamide-2',
1-methyl-dihydro-D-lysergic acid-(+)-butanolamide-(2') and
1-methyl-dihydro-D-lysergic acid-(+)-propanolamide-(2') and the acid addition salts of all these compounds are not hallucinogenic but, on the other hand, show a distinct serotonin antagonistic effect which may be made use of in combating conditions of allergy, migraine and rheumatism.

The following examples set forth representative embodiments of the invention. In these examples, the parts are by weight unless otherwise indicated, and the relationship between parts by weight and parts by volume is the same as that between grams and milliliters. The temperatures are stated in degrees centigrade.

*Example 1.—1-methyl-ergotamine and 1-methyl-ergotaminine*

0.15 part of potassium are dissolved in 150 parts by volume of liquid ammonia; oxidation is carried out with ferric nitrate to produce potassium amide, and 1.16 parts of dry ergotamine are thereupon dissolved in the resultant mixture. After 15 minutes, 0.280 part of methyl iodide in 5 parts by volume of ether are added to the obtained yellow solution, after which the mixture is allowed to stand in air for 30 minutes. The liquid ammonia is then evaporated off and the dry residue is shaken out with a binary solvent, consisting of ether and aqueous tartaric acid. Sodium bicarbonate is added to the aqueous phase and the thus-liberated bases are taken up in chloroform, dried over sodium bicarbonate, and evaporated to dryness under reduced pressure. The residual crude base mixture is chromatographed on a column of 40 parts of aluminum oxide. 1-methyl-ergotamine and 1-methyl-ergotaminine are eluted with absolute chloroform, the first-named compound appearing first in the filtrate. The so-obtained 1-methyl-ergotamine crystallizes from methanol in the form of plates containing 1 mol of methanol of crystallization, the product having a melting point of 185°. $[\alpha]_D^{20}=-170°$ (c.=0.5 in chloroform). Keller's color reaction: blue, less reddish than ergotamine. The obtained 1-methyl-ergotaminine crystallizes from methanol, in which solvent it is very difficultly soluble, in the form of spherical aggregates of short prisms; melting point 224°. $[\alpha]_D^{20}=+403°$ (c.=0.5 in pyridine). Keller's color reaction: blue, like 1-methyl-ergotamine.

*Example 2.—1-methyl-dihydro-ergotamine*

Potassium amide is prepared from 0.1 part of potassium in 100 parts by volume of liquid ammonia, after the manner described in Example 1, whereupon 1.16 parts of dihydro-ergotamine are added, and the mixture allowed to stand for 30 minutes after complete dissolution has been achieved. 0.35 part of methyl iodide in 5 parts by volume of ether are then added, the mixture is allowed to stand for 30 minutes longer and then worked up after the manner described in Example 1. 1-methyl-dihydro-ergotamine is obtained as crude product which can be crystalized from ethyl acetate; short prisms of melting point 224°. $[\alpha]_D^{20}=-67°$ (c.=0.5 in pyridine). Keller's color reaction: blue, less reddish and weaker than dihydro-ergotamine.

*Example 3.—1-methyl-dihydro-ergokryptine*

Potassium amide is prepared from 0.130 part of potassium in 80 parts by volume of liquid ammonia after the manner described in Example 1, whereupon 1 part of dihydro-ergokryptine is added and then, 5 minutes after complete dissolution is achieved, 0.45 part of methyl iodide in 5 parts by volume of ether are also added. The mixture is allowed to stand for 40 minutes in air, after which it is worked up in the manner described in Example 1. The so-obtained crude 1-methyl-dihydro-ergokryptine is crystallized from benzene, yielding plates which melt at 244–245°. $[\alpha]_D^{20}=-40°$ (c.=0.5 in pyridine). Keller's color reaction: blue, less reddish and weaker than dihydro-ergokryptine.

*Example 4.—1-methyl-dihydro-ergocristine*

1-methyl-dihydro-ergocristine is praperad after the manner described in Examples 1 to 3. The product is obtained in the form of non-uniform plates which melt at 244–246° after recrystallization from benzene. $[\alpha]_D^{20}=-41°$ (c.=0.5 in pyridine). Keller's color reaction: blue, less reddish and weaker than dihydro-ergocristine.

*Example 5.—1-methyl-dihydro-ergocornine*

1-methyl-dihydro-ergocorine is prepared after the manner described in Examples 1 to 3. It is obtained in the form of plates with 1 mol of ethanol of crystallization melting at 215–218°, after recrystallization from ethanol; $[\alpha]_D^{20}=-43.5°$ (c.=0.5 in pyridine). Keller's color reaction: blue, less reddish than dihydro-ergocornine.

*Example 6.—1-benzyl-dihydro-ergocristine*

Potassium amide is prepared from 0.50 part of potassium in 200 parts by volume of liquid ammonia, oxidation being effected with ferric nitrate, after which 1.90 parts of dihydro-ergocristine are added, and the mixture allowed to stand for 20 minutes after dissolution is complete. 0.60 part of benzyl bromide in 5 parts by volume of ether are then added, and the mixture allowed to stand for another 30 minutes. The liquid ammonia is then evaporated off and the dry residue shaken out with a binary solvent constituted by a mixture ether and aqueous tartaric acid. Sodium bicarbonate is added to the aqueous phase and the thus-liberated bases are taken up in chloroform, dried over sodium bicarbonate, and evaporated to dryness under reduced pressure. Chromatography of the crude base mixture on 80 parts of aluminum oxide, using chloroform $+\frac{1}{10}\%$ of ethanol as eluting agent, yields 1.4 parts of pure 1-benzyl-dihydro-ergocristine, which crystallizes out from benzene in the form of long needless which melt at 155–160°. $[\alpha]_D^{20} = -58°$ (c.=0.5 in pyridine). Keller's color reaction: dull blue, becoming greenish gray blue in the course of several seconds.

*Example 7.—1-benzyl-dihydro-ergocornine*

1-benzyl-dihydro-ergocornine is prepared after the manner described in Example 6 by converting dihydro-ergocornine into the potassium salt, and reacting the latter with benzyl bromide. The new compound crystallizes from ethanol in the form of short prisms or polyhedrons which melt at 170–174°. $[\alpha]_D^{20} = -51°$ (c.=0.5 in pyridine). Keller's color reaction: dirty gray blue.

*Example 8.—1-benzyl-dihydro-ergokryptine*

1-benzyl-dihydro-ergokryptine is prepared after the manner described in Example 6 by converting dihydro-ergokryptine into the potassium salt, and reacting the later with benzyl bromide. The new compound crystallizes from benzene in the form of long rodlets which melt at 154–160°. $[\alpha]_D^{20} = -51°$ (c.=0.5 in pyridine). Keller's color reaction: dull blue, becoming greenish gray blue in the course of several seconds.

*Example 9.—1-allyl-dihydro-ergocristine*

Potassium amide is prepared from 1.5 parts of potassium in 500 parts by volume of liquid ammonia, oxidation being effected with ferric nitrate, after which 5.87 parts of dihydro-ergocristine are added, and the mixture allowed to stand for 10 minutes after complete dissolution has been achieved. 1.5 parts of allyl bromide in 5 parts by volume of ether are then added, and the mixture allowed to stand at −60°. The liquid ammonia is then evaporated off and the dry residue shaken out with a binary solvent constituted by a mixture ether and aqueous tartaric acid. Sodium bicarbonate is added to the aqueous phase and the thus-liberated bases are taken up in chloroform, dried over sodium bicarbonate, and evaporated to dryness under reduced pressure. Chromatography of the obtained crude base mixture on 250 parts of aluminum oxide, using chloroform $+\frac{1}{10}\%$ of ethanol as eluting agent, yields 4 parts of pure 1-allyl-dihydro-ergocristine, which crystallizes from ethyl acetate in the form of thin boat-shaped platelets which melt at 166–168°; $[\alpha]_D^{20} = -51°$ (c.=0.5 in pyridine). Keller's color reaction: blue, becoming gray-green in several minutes.

*Example 10.—1-allyl-dihydro-ergocornine*

1-allyl-dihydro-ergocornine is prepared after the manner described in Example 9 by converting dihydro-ergocornine into the potassium salt, and then reacting the latter with allyl bromide. Short fine needles which melt at 180–181° are obtained by crystallization from benzene. $[\alpha]_D^{20} = -50°$ (c.=0.5 in pyridine). Keller's color reaction: blue, becoming gray-green in several minutes.

*Example 11.—1-allyl-dihydro-ergokryptine*

1-allyl-dihydro-ergokryptine is prepared after the manner described in Examples 9 and 10 by converting dihydro-ergokryptine into the potassium salt, and reacting the latter with allyl bromide. The obtained 1-allyl-dihydro-ergokryptine crystallizes from benzene in the form of plates which melt at 224–225°. $[\alpha]_D^{20} = -40°$ (c.=0.5 in pyridine). Keller's color reaction: blue, becoming olive green after several minutes.

*Example 12.—1-methyl-ergobasine*

1-methyl-ergobasine is prepared after the manner described in Example 1 by converting ergobasine into the potassium salt and reacting the latter with methyl iodide. The obtained 1-methyl-ergobasine crystallizes from chloroform as short rodlets which melt at 178–179°. $[\alpha]_D^{20} = -22.0°$ (c.=0.5 in pyridine). Keller's color reaction: blue, less reddish than ergobasine.

The dioxalate in the form of prisms has a melting point of 163–168° $[\alpha]_D^{20} = +50°$ (c.=0.3 in water).

*Example 13.—1-methyl-lysergic acid-1'-hydroxy-butylamide-2'*

0.9 part of potassium are dissolved in 500 parts by volume of liquid ammonia, then oxidized with ferric nitrate to potassium amide, after which 4.85 parts of lysergic acid-1'-hydroxy-butylamide-2' are dissolved in the obtained mixture. After 15 minutes there are added to the obtained yellow solution 4.1 parts of methyl iodide in 5 parts by volume of ether, the mixture being allowed to stand for 30 more minutes at −60°. The liquid ammonia is thereupon evaporated and the dry residue is shaken out between water and chloroform. The mixture of bases which remains after the evaporation of the chloroform is chromatographed on a column of 250 parts of aluminum oxide, the desired 1-methyl-lysergic acid-1'-hydroxy-butylamide-2' being washed into the filtrate with chloroform and chloroform $+0.2\%$ ethanol. The 1-methyl-lysergic acid-1'-hydroxy-butylamide-2' crystallizes from chloroform in the form of plates which melt at 194–196°. $[\alpha]_D^{20} = -45°$ (c.=0.5 in pyridine). Keller's color reaction: blue, less reddish and weaker than starting material.

The substance forms a neutral tartrate which—upon recrystallization from methanol—contains one mol of methanol of crystallization. Its melting point is not characteristic. Sintering from 110°. $[\alpha]_D^{20} = -50°$ (in water).

The following Table shows some physical properties of further salts of 1-methyl-lysergic acid-1'-hydroxy-butylamide-2' which are produced.

TABLE

| Salt | Melting Point | Optical Rotation $[\alpha]_D^{20}$ | Crystal Form |
| --- | --- | --- | --- |
| Dioxalate | 167–168° | +39° (c.=0.6 in water). | Prisms. |
| Dimaleinate | 187–188° | +52° (c.=0.4 in water). | Short needles. |
| Perchlorate | 225° (with decomposition above 218°). | +50° (c.=0.25 in water). | Fine leaflets. |
| Methane-sulfonate. | 201–203° (with decomposition above 180°). | +42° (c.=0.7 in water). | Aggregates having no recognisable crystalline shape. |

*Example 14.—1-methyl-dihydro-D-lysergic acid-(+)-butanolamide-(2')*

8 cc. of a palladium (II) chloride solution (produced from 100 g. of palladium (II) chloride, 300 cc. of 2 N hydrochloric acid solution and 200 cc. of water) are added to a solution of 35 g. of 1-methyl-D-lysergic acid-(+)-butanolamide-(2') bismaleinate in 2.5 litres of 40% dioxane and shaking at room temperature and a pressure of 61 atmospheres with hydrogen is effected until no more hydrogen is absorbed. Subsequently the catalyst is filtered off, the filtrate is reduced to a small volume and the residue is shaken out between dilute aqueous sodium hydrogen carbonate solution and chloroform. The chloroform solution is reduced to a volume of about 20 cc. and approximately 100 to 200 cc. of ether are added, whereby 1-methyl-dihydro-D-lysergic acid-(+)-butanolamide-(2') crystallizes out in the form of colourless prisms having a melting point of 235–237°. $[\alpha]_D^{20} = -156°$ (c.=0.5 in pyridine).

Keller's colour reaction: blue.

*Tartrate.*—A solution of 23.5 g. of 1-methyl-dihydro-D-lysergic acid-(+)-butanolamide-(2') in 320 cc. of boiling methanol is added to a solution of 5.2 g. of D- tartaric acid in 30 cc. of methanol. After adding 500 cc. of ether and cooling to 0°, the tartrate crystallizes out in the form of colourless needles having an indeterminate and unclear melting point.

$[\alpha]_D^{20} = -50°$ (c.=0.5 in water).

*Example 15.—1-methyl-dihydro-D-lysergic acid-(+)-propanolamide-(2')*

A solution of 2.6 cc. of palladium (II) chloride (produced from 100 g. of palladium (II) chloride, 300 cc. of 2 N hydrochloric acid solution and 200 cc. of water) is added to a solution of 10 g. of 1-methyl-D-lysergic acid-(+)-propanolamide-(2') in 500 cc. of 40% dioxane and shaking at room temperature and a pressure of 61 atmospheres with hydrogen is effected until no more hydrogen is absorbed. Subsequently the catalyst is filtered off, the filtrate is reduced to a small volume and the residue is shaken out between dilute aqueous sodium hydroxide solution and chloroform. The chloroform solution is dried over sodium sulphate and the solvent is removed. The resulting crude product is chromatographed on a column of 40 g. of aluminum oxide, whereby 1 - methyl - dihydro - D-lysergic acid-(+)-propanolamide-(2') of a pure white colour is eluted into the filtrate with chloroform. The material is present in the form of prisms having a melting point of 214–217°.

$[\alpha]_D^{20} = -129°$ (c.=0.5 in pyridine).

Keller's colour reaction: blue.

Although the present invention is described herein with particular reference to specific details, it is not intended that such details shall be regarded as limitations upon the scope of the invention except insofar as included in the accompanying claims.

We claim:
1. 1-methyl-ergotamine.
2. 1-methyl-dihydro-ergotamine.
3. 1-methyl-dihydro-ergocornine.

No references cited.

NICHOLAS S. RIZZO, *Primary Examiner.*